United States Patent

Ezaki

[15] 3,656,129

[45] Apr. 11, 1972

[54] MAGNETIC-CORE MEMORY MATRIX

[72] Inventor: Joichiro Ezaki, Funabashi-shi, Japan

[73] Assignee: TDK Electronics Company Ltd., Chiyoda-ku, Tokyo, Japan

[22] Filed: Aug. 26, 1969

[21] Appl. No.: 853,026

[30] Foreign Application Priority Data

Sept. 3, 1968 Japan....................................43/76211

[52] U.S. Cl.....................................340/174 CR, 340/174 M

[51] Int. Cl.....................................G11c 5/06, G11c 11/06

[58] Field of Search..............................340/174 M, 174 CR

[56] References Cited

UNITED STATES PATENTS

| | | | |
|---|---|---|---|
| 2,961,745 | 11/1960 | Smith, Jr. | 340/174 MA |
| 3,381,281 | 4/1968 | Doughty et al. | 340/174 |

*Primary Examiner*—James W. Moffitt

*Attorney*—Burgess, Ryan and Wayne

[57] ABSTRACT

A magnetic-core memory matrix in which conductive connecting portions are fixed to an insulating board at the curved or intersecting portions of the sense windings for connecting the ends of said sense windings.

4 Claims, 3 Drawing Figures

Patented April 11, 1972 3,656,129

MAGNETIC-CORE MEMORY MATRIX

BACKGROUND OF THE INVENTION

The present invention relates to a magnetic-core memory matrix for electronic computers and more particularly a magnetic-core memory matrix incorporating an improved sense winding threading method.

Generally, a conventional magnetic-core matrix is threaded as shown in FIG. 1. That is, cores 1 are threaded at the intersections of X-drive windings ($x_1$, $x_2$ and so on) and the Y-drive windings ($y_1$, $y_2$ and so on) and the sense winding S is threaded in parallel with either of the X-or Y-drive windings (Y-drive windings in FIG. 1). In order to reduce the noises produced in the sense windings S by the induction from the Y-drive windings, the cores 1 belonging to one Y-drive winding is divided into the groups *a* and *b* equal in number of cores 1 (In FIG. 1, the cores are divided into the groups each consisting of four cores) and the sense winding S is crossed or intersected between these groups *a* and *b*. In order to fabricate the magnetic-core memory matrix as illustrated in FIG. 1, upon an insulating board 2 shown in FIG. 2 printed terminals $y_p$ are provided for connecting the ends of Y-drive windings, printed terminals $x_p$ for connecting the ends of the X-drive windings and printed terminals $s_p$ for connecting the ends of the sense windings.

Since the X-and Y-drive windings extend straight upon the insulating board 2, these drive windings do not deviate from their original positions when both ends of these windings are securely fixed to the printed terminals. However, in case of the sense windings, they are curved and intersected as indicated by $sl_1$ and $sl_2$ respectively in FIG. 2 so that the sense windings tend to deviate, whereby balanced state for eliminating the noise will be adversely affected.

SUMMARY OF THE INVENTION

The primary object of the present invention is to provide an improved magnetic-core memory matrix which can completely eliminate the deviation of the sense windings thereof.

According to the present invention, conductive connecting members are formed upon an insulating board at the curved or intersecting portions of the sense windings and the ends of the sense windings are connected to these conductive connecting members so that the sense winding may be extended straight as in the case of the X-and Y-drive windings.

According to one embodiment of the present inventions, the above described crossed connecting members comprise printed patterns. Thus, the present invention can offer the following remarkable features so far unattainable by the conventional core matrix.

1. The spacing between the drive windings and the sense winding may be uniformly maintained at all times so that less noise is produced, thereby eliminating the noise adjustment step (adjustment of the spacing between the sense windings); and 2. Since no loop is formed, the threading of the sense windings are much facilitated.

DESCRIPTION OF THE PREFERRED EMBODIMENT

Figure 1:
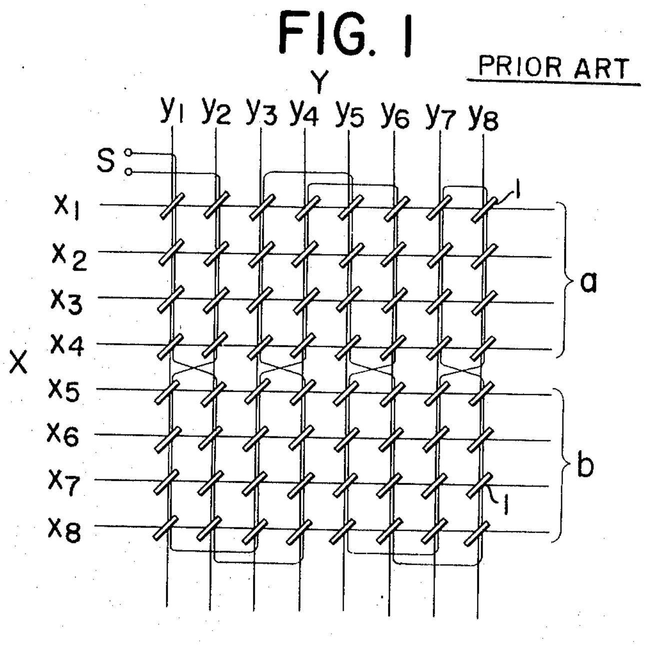
FIG. 1 is a pattern for threading a magnetic core memory matrix.
Figure 2:
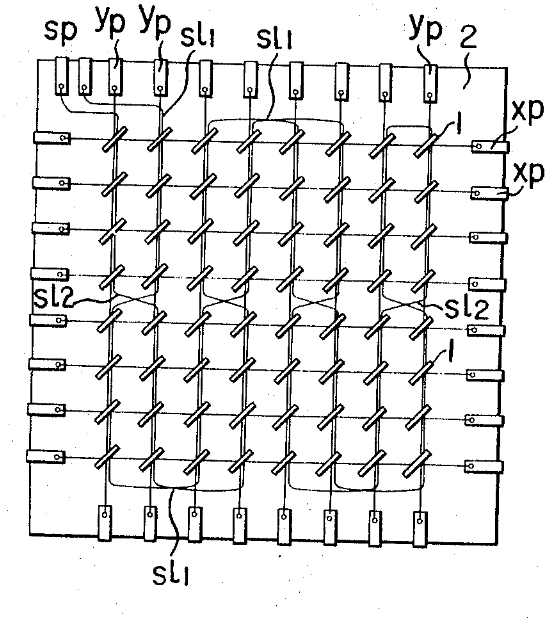
FIG. 2 PRIOR ART
FIG. 2 is a front view of a conventional magnetic-core memory matrix.
Figure 3:
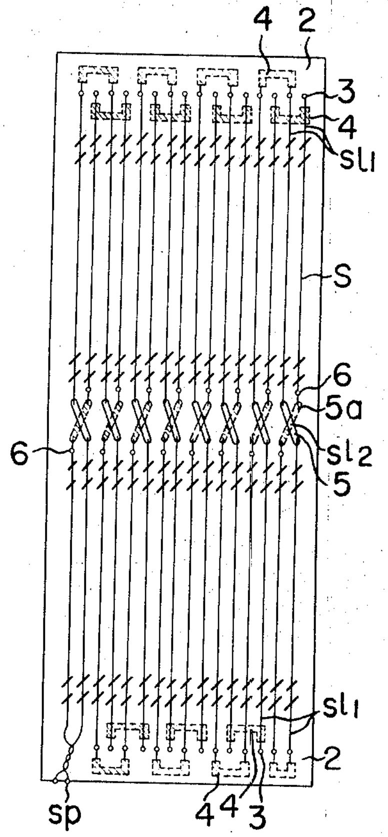
FIG. 3 is a segmental front view of one embodiment of the present invention.

Referring to FIG. 3, the curved or intersecting portions $sl_1$ and $sl_2$ of the sense windings S are passed through the holes 3 provided in the insulating board 2 toward the undersurface thereof so as to be connected to the printed pattern 4 formed upon the undersurface. Furthermore, the intersecting portions $sl_2$ of the sense windings S are connected to the crossed connectors or printed patterns 5 and 5*a* formed at the front surface and the undersurface of the insulating board 2 respectively. When connected to the connector or printed patterns 5*a* at the undersurface of the board 2, the sense windings S are passed through the holes 6 for connection. In FIG. 3, the X and Y drive windings are not shown for the convenience of illustration.

I claim:

1. A magnetic-core memory matrix comprising a plurality of cores, a plurality of sense windings and X-and Y-drive windings, a single insulating board on which said cores are mounted, a plurality of connectors attached to said board, first and second groups of said connectors being mounted on one side of said board and being connected to said X-and Y-drive windings, respectively, and a third group of said connectors being mounted on the opposite side of said board and being connected to said sense windings, said board being provided with apertures and pairs of crossed connectors, one of said pairs of connectors being mounted on one side of said board and the other of said pairs of connectors being mounted on the opposite side, said sense winding being connected to form a complete electrical path by said pairs of connectors through said apertures.

2. A matrix as set forth in claim 1 wherein said sense windings extend across said board in substantially straight lines.

3. A matrix as set forth in claim 2 wherein said sense windings intersect only one of said X-and Y-drive windings and are parallel to the other of said X-and Y-drive windings.

4. A matrix as set forth in claim 3 wherein the distance between said sense windings and the parallel one of said drive windings is maintained constant across said insulating board.

* * * * *